March 12, 1963     I. K. DORTORT     3,081,424
SEMI-CONDUCTOR RECTIFIER BRIDGE CONSTRUCTION
Filed Jan. 11, 1960     2 Sheets-Sheet 1
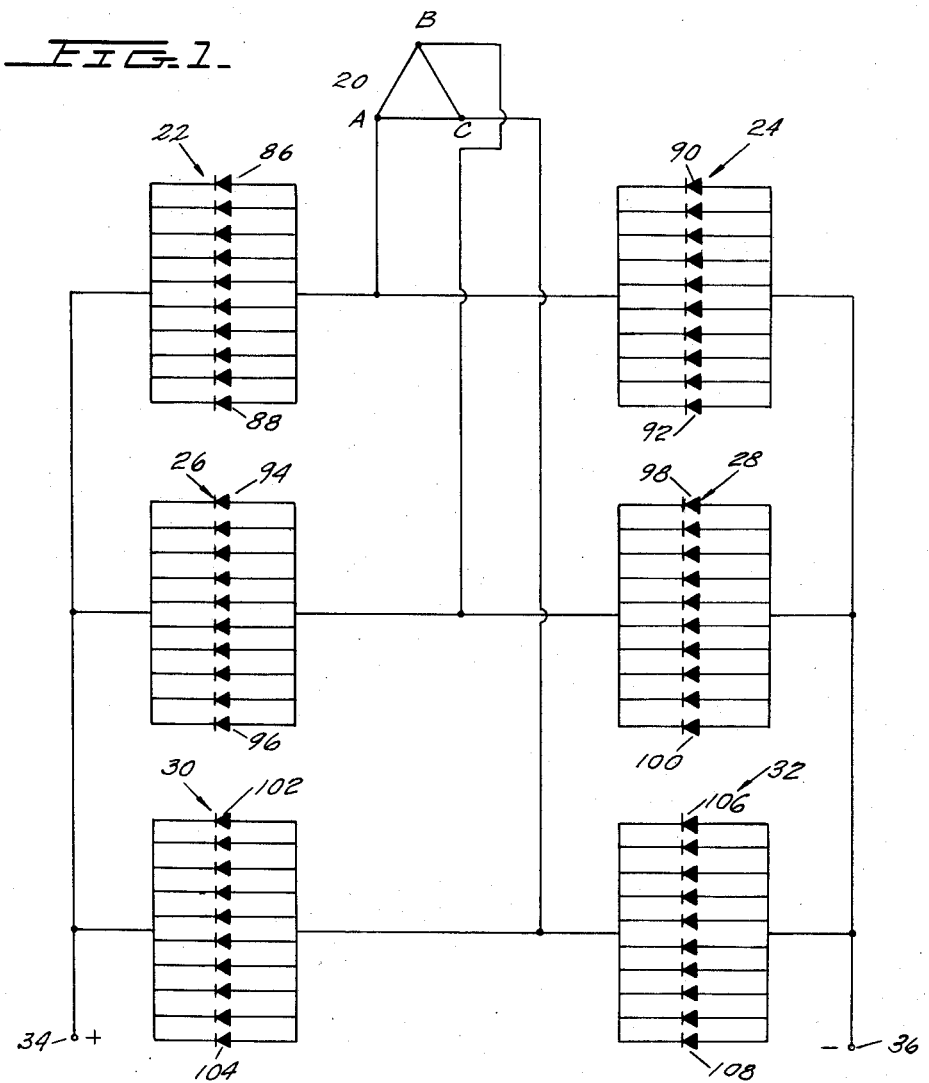
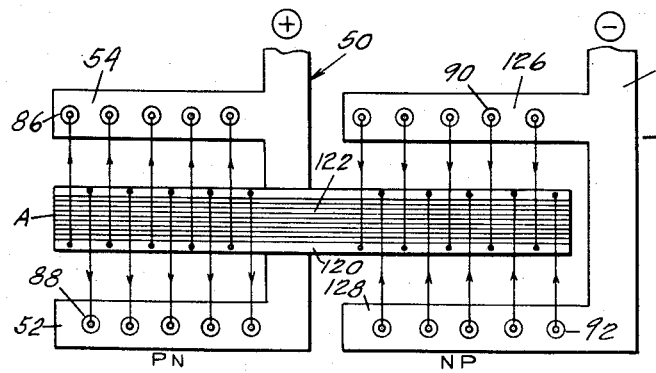
INVENTOR.
ISADORE K. DORTORT
BY
OSTROLENK, FABER, GERB & SOFFEN
ATTORNEYS March 12, 1963     I. K. DORTORT     3,081,424
SEMI-CONDUCTOR RECTIFIER BRIDGE CONSTRUCTION
Filed Jan. 11, 1960     2 Sheets-Sheet 2
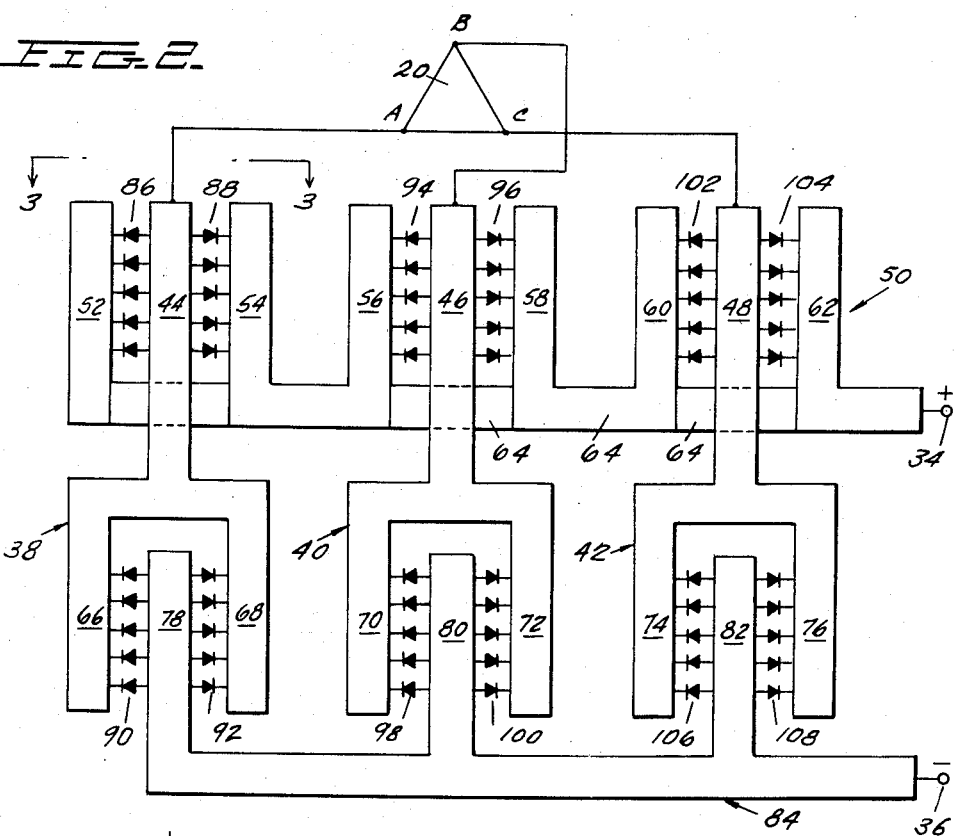
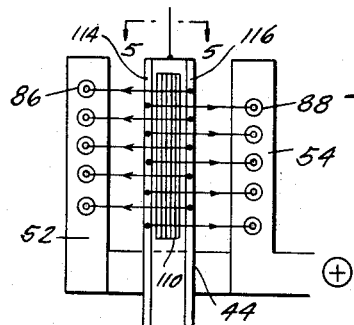
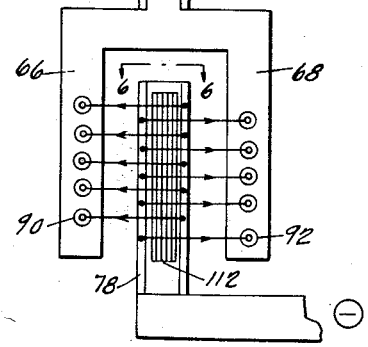
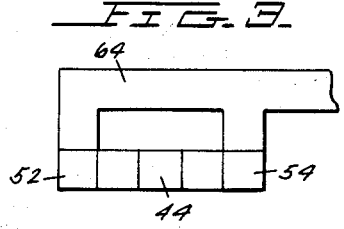
INVENTOR.
ISADORE K. DORTORT
BY
OSTROLENK, FABER, GERB & SOFFEN
ATTORNEYS

United States Patent Office 3,081,424
Patented Mar. 12, 1963

3,081,424
SEMI-CONDUCTOR RECTIFIER BRIDGE
CONSTRUCTION
Isadore K. Dortort, Philadelphia, Pa., assignor to I-T-E Circuit Breaker Company, Philadelphia, Pa., a corporation of Pennsylvania
Filed Jan. 11, 1960, Ser. No. 1,481
9 Claims. (Cl. 321—8)

This invention relates to a structural arrangement for a bridge connected rectifier circuit having a plurality of parallel connected cells in each bridge arm, and more particularly relates to a simplified bus arrangement for such a bridge construction.

High current capacity, low voltage rectifier units are required in many applications, such as in supplying power for electro-chemical operations wherein D.-C. currents of the order of 10,000 amperes at D.-C. voltages of the order of 400 volts must be supplied.

When using semi-conductor cells as a rectifier medium in a bridge connected circuit, many cells must be connected in parallel in each arm in order to meet the high current requirements of the arm. The electrical bus connections for such a system are generally extremely complex because of the large number of individual circuits required, and this complex bus arrangement leads to extremely large amounts of conducting material such as copper, relatively high losses, and requires considerable space.

In accordance with the present invention, a bus configuration is presented wherein the bus bar configuration is extremely simplified and runs in generally straight lines.

Furthermore, the novel bus configuration of the invention is easily and simply adapted to carry current balancing reactors of the type described in co-pending application Serial No. 733,152 filed May 5, 1958 in the name of Otto Jensen et al., entitled "Current Balancing Reactors for Diodes," and assigned to the assignee of the present invention, and now Patent No. 2,996,626.

Accordingly, the primary object of this invention is to provide a novel bus configuration for a bridge connected rectifier system composed of pluralities of parallel connected semi-conductor cells.

Another object of this invention is to provide a novel bus configuration for bridge connected semi-conductor rectifiers which provides savings of conducting material such as copper, decreases losses, and saves space.

A still further object of this invention is to provide a novel simple bus configuration for bridge connected rectifiers using pluralities of parallel connected semi-conductor cells which is easily adapted to carry current balancing magnetic means for balancing the currents in parallel connected cells.

These and other objects of my invention will become apparent from the following description when taken in connection with the drawings in which:

FIGURE 1 shows a circuit diagram of a three-phase bridge connected rectifier having pluralities of parallel connected cells in each arm.

FIGURE 2 shows the manner in which my novel bus configuration is arranged for the circuit of FIGURE 1 where the semi-conductor cells are PN junctions.

FIGURE 3 is a view of the bus configuration of FIGURE 2 taken across the lines 3—3 in FIGURE 2.

FIGURE 4 shows a portion of the bus structure of FIGURE 2 which applies to one phase and illustrates how the bus structure is adapted to carry current balancing laminations.

FIGURE 5 is a cross-sectional view of FIGURE 4 taken across the lines 5—5 of FIGURE 4.

FIGURE 6 is a cross-sectional view of FIGURE 4 taken across the lines 6—6 in FIGURE 4.

FIGURE 7 shows, for one phase of FIGURE 2, how the bus configuration may be simplified by making half of the cells NP junctions, and the other half of the cells PN junctions.

Referring now to FIGURE 1, a typical three-phase full wave rectifier is shown which has a power transformer secondary winding 20 having three phases A, B and C.

Phase A is connected to a first positive half-wave group of ten parallel connected cells 22 and a second negative half-wave group of ten parallel connected cells 24. Each of the cells included in groups 22 and 24 may be of silicon or germanium and are connected in parallel in order to achieve a relatively high current rating. If the voltage requirements of the system exceed the rated voltages of the cells in groups 22 and 24, then an additional group of series elements may be used in the usual manner. Furthermore, the cells 22 and 24 may be individually fused in the usual manner so that they will be removed from the circuit upon a failure of any one of the cells.

The remaining phases B and C are formed in the same manner as that described for phase A where phase B has a positive half wave parallel connected group of cells 26 and a negative half wave group of parallel connected cells 28, while phase C has groups of positive cells 30 and negative cells 32.

The left-hand side of all of the cells of groups 22, 26 and 30 are then connected together to a common bus and brought out to a positive rectifier terminal 34, while the right-hand side of cell groups 24, 28 and 32 are connected together to form the negative terminal 36.

From the circuit of FIGURE 1, it will be apparent that the bus arrangement for forming the high current capacity electrical connections will be exceedingly complex. This arrangement has been reduced to its most simple form by the novel invention as set forth in FIGURE 2.

Referring now to FIGURE 2, three solid bifurcated bus elements 38, 40 and 42 have their extending legs 44, 46 and 48 respectively connected to phases A, B and C of power transformer 20 respectively. A positive bus structure 50 connected to terminal 34 is then formed having extending legs 52, 54, 56, 58, 60 and 62 which are fastened to a common bottom bus 64 which, as seen in FIGURES 2 and 3, follows a broken path to overlie extending legs 44, 46 and 48, while placing legs 52 and 54 adjacent either side of leg 44, and placing legs 52 and 58 adjacent either side of leg 46, and placing legs 60 and 62 adjacent either side of extending leg 48.

The bifurcated legs 66 and 68 of member 38, and bifurcated legs 70 and 72 of member 40, and bifurcated legs 74 and 76 of member 42, straddle extending portions 78, 80 and 82, respectively, of the negative bus bar 84 which is connected to negative terminal 36.

The individual cell arms 22 through 32 may then be connected, as shown in FIGURE 2, where the first five cells of arm 22, such as cell 86 extend from leg 44 to leg 52, while the second five cells of arm 22 such as cell 88 extend from leg 44 to leg 54. Thus, the positive half wave portion of phase A is completed, and extends to the positive terminal 34.

The negative arm 24 of phase A is formed by a first group of five of the cells, such as cell 90 extending from leg 78 to leg 66, and the remaining five cells of group 24 such as cell 92 extend from leg 78 to leg 68.

In the same manner, each of the cells of groups or arms 26 through 32 are broken in sections and are arranged as shown in FIGURE 2 for typical cells 94 and 96 of the positive half of phase B, cells 98 and 100 of the negative half of phase B, cells 102 and 104 of the positive half of phase C, and cells 106 and 108 of the negative half of phase C.

It is apparent that this bus arrangement using the basic concept of the single bifurcated bus elements 38, 40 and 42 which receive one terminal of all of the cells of their respective phase promotes extreme simplicity of construction, economy of material and economy of space.

The cells of FIGURES 1 and 2 are PN junctions whereby conventional current flow through the cells is toward the positive terminal 34.

For large current capacity individual cells, the cells generally are formed with a threaded connecting point which may be threaded into a cooperating tapped opening in the bus bar. Thus, in FIGURE 4, which shows a modification of phase A of FIGURE 2, whereby the bus bars carry a current balancing structure for balancing the current between the parallel connected cells, the cells are illustrated as cylinders threaded into legs 52, 54, 66 and 68.

The use of current balancing laminations is well known, and is set forth, for example, in above noted copending application Serial No. 733,152.

In FIGURE 4, the current balancing laminations are shown as a first stack of laminations 110 carried by leg 44 and stack 112 carried by leg 78. Clearly, the other phases B and C, not shown in FIGURE 4, are adapted with current balancing laminations in this same manner.

As best seen in FIGURES 5 and 6, leg 44, when adapted to carry the current balancing iron, is formed of L-shaped conductors 114 and 116 which serve as a support for the current balancing laminations, and leg 78 is formed of similar L-shaped conductors 115 and 117. Those cells which terminate on leg 52 are electrically connected to bus member 116, and extend through the lamination stack 110 in insulated relationship with respect to bus 114, and, conversely, those cells terminating on leg 54 are electrically connected to bus portion 114, and are electrically insulated from bus portion 116. Thus, the current path through the laminations will not be short circuited. The cells, such as cells 90 and 92 of group 24, extend through laminations 112 in the same manner whereby the current path of all of the cells goes through the lamination stack.

As is seen in FIGURE 5, the current carrying area of leg 44 is increased by approximately 40 percent by an additional common conductor 118, since it will carry a higher current than leg 78. More specifically, the current in leg 78 will be the D.-C. current divided by the square root of three, while the current in leg 44 will be the square root of two-thirds times the D.-C. current.

A further simplification of the structure of FIGURES 1 and 4 is possible where the negative groups of cells 24, 28 and 32 are formed of NP junctions, while the positive groups of cells 22, 24 and 30 are formed of PN junctions.

Thus, as shown in FIGURE 7, the bus conductor for phase A corresponding to conductor 38 in FIGURE 2 may now be formed of a simple straight conductor 120 formed in cross-section, as shown in FIGURE 5, and carrying the current balancing laminations 122 in the manner shown in above noted co-pending application Serial No. 733,152.

In FIGURE 7, the current paths of cells 86 and 88 enter legs 52 and 54 of the positive bus, as shown in FIGURE 2, these cells being PN junctions. The negative bus, however, is now formed of bus 124 having extending legs 126 and 128 which, for example, receive cells 90 and 92 which are of the NP type, since the conventional current runs from legs 126 and 128 and into straight bus member 120. Clearly, the remaining phases B and C in FIGURE 7 will be completed in the manner identical to that shown for phase A including bus 120.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. In a high current capacity three-phase bridge connected rectifier system for transferring power between a D.-C. system and a three-phase A.-C. system; each of the arms of said three-phase bridge connected rectifier system having a plurality of parallel connected cells; a first, second, and third bus member connected to a respective phase of said three-phase A.-C. system; each of said first, second and third bus members being elongated members and having first and second cell receiving portions; said first and second cell receiving portions being axially spaced along their respective elongated members; said first cell receiving portion of said first, second and third bus members receiving one terminal of the cells of each of the respective positive half wave arms of said three-phase bridge connected rectifier; the other terminal of said cells of said positive half wave arms being connected to a respective positive bus bar extension positioned adjacent respective first cell receiving portions of said bus member; said second cell receiving portion of said first, second and third bus members receiving one terminal of the cells of each of the respective negative half wave arms of said three-phase bridge connected rectifier; the other terminal of said cells of said negative half wave arms being connected to a respective negative bus bar extension positioned adjacent respective second cell receiving portions of said bus members; said first portions of said bus members carrying magnetic laminations for magnetically coupling the individual currents carried by the said parallel connected cells connected to said first portions.

2. In a high current capacity three-phase bridge connected rectifier system for transferring power between a D.-C. system and a three-phase A.-C. system; each of the arms of said three-phase bridge connected rectifier system having a plurality of parallel connected cells; a first, second, and third bus member connected to a respective phase of said three-phase A.-C. system; each of said first, second and third bus members being elongated members and having first and second cell receiving portions; said first and second cell receiving portions being axially spaced along their respective elongated members; said first cell receiving portion of said first, second and third bus members receiving one terminal of the cells of each of the respective positive half wave arms of said three-phase bridge connected rectifier; the other terminal of said cells of said positive half wave arms being connected to a respective positive bus bar extension positioned adjacent respective first cell receiving portions of said bus member; said second cell receiving portion of said first, second and third bus members receiving one terminal of the cells of each of the respective negative half wave arms of said three-phase bridge connected rectifier; the other terminal of said cells of said negative half wave arms being connected to a respective negative bus bar extension positioned adjacent respective second cell receiving portions of said bus members; said first portions of said bus members carrying magnetic laminations for magnetically coupling the individual currents carried by each of the said parallel connected cells of any of said positive half wave arms of said three-phase bridge connected rectifier; said first portions of said bus members being comprised of parallel conductors having flat portions adjacent to said magnetic laminations.

3. In a high current capacity three-phase bridge connected rectifier system for transferring power between a D.-C. system and a three-phase A.-C. system; each of the arms of said three-phase bridge connected rectifier system having a plurality of parallel connected cells; a first, second, and third bus member connected to a respective phase of said three-phase A.-C. system; each of said first, second and third bus members being elongated members and having first and second cell receiving portions; said first and second cell receiving portions being axially spaced along their respective elongated members; said first cell receiving portion of said first, second and third bus members receiving one terminal of the cells of each of the respective positive half wave arms of said three-phase bridge connected rectifier; the other terminal of said cells of said positive half wave arms being connected to a respective positive bus bar extension positioned adjacent respective first cell receiving portions of said bus member; said second cell receiving portion of said first, second and third bus members receiving one terminal of the cells of each of the respective negative half wave arms of said three-phase bridge connected rectifier; the other terminal of said cells of said negative half wave arms being connected to a respective negative bus bar extension positioned adjacent respective second cell receiving portions of said bus members; all of said cells being PN type junctions; all of said cells of said positive half wave arms being supported by said positive bus bar extension; all of said cells of said negative half wave arms being supported by said respective second portions of said bus members; said first portions of said bus members carrying magnetic laminations for magnetically coupling the individual currents carried by each of the said parallel connected cells of any of the positive arms of said three-phase bridge connected rectifier; said first portions of said bus members being comprised of parallel conductors having flat portions adjacent to said magnetic laminations.

4. In a high current capacity three-phase bridge connected rectifier system for transferring power between a D.-C. system and a three-phase A.-C. system; each of the arms of said three-phase bridge connected rectifier system having a plurality of parallel connected cells; a first, second, and third bus member connected to a respective phase of said three-phase A.-C. system; each of said first, second and third bus members being elongated members and having first and second cell receiving portions; said first and second cell receiving portions being axially spaced along their respective elongated members; said first cell receiving portion of said first, second and third bus members receiving one terminal of the cells of each of the respective positive half wave arms of said three-phase bridge connected rectifier; the other terminal of said cells of said positive half wave arms being connected to a respective positive bus bar extension positioned adjacent respective first cell receiving portions of said bus member; said second cell receiving portion of said first, second and third bus members receiving one terminal of the cells of each of the respective negative half wave arms of said three-phase bridge connected rectifier; the other terminal of said cells of said negative half wave arms being connected to a respective negative bus bar extension positioned adjacent respective second cell receiving portions of said bus members; all of said cells being NP type junctions; all of said cells of said positive half wave arms being supported by said positive bus bar extensions; all of said cells of said negative half wave arms being supported by said first portions of said two members; said first portions of said bus members carrying magnetic laminations for magnetically coupling the individual currents carried by each of the said parallel connected cells of any of the negative arms of said three-phase bridge connected rectifier; said first portions of said bus members being comprised of parallel conductors having flat portions adjacent to said magnetic laminations.

5. In a high current capacity three-phase bridge connected rectifier system for transferring power between a D.-C. system and a three-phase A.-C. system; each of the arms of said three-phase bridge connected rectifier system having a plurality of parallel connected cells; a first, second, and third bus member connected to a respective phase of said three-phase A.-C. system; each of said first, second and third bus members being elongated members and having first and second cell receiving portions; said first and second cell receiving portions being axially spaced along their respective elongated members; said first cell receiving portion of said first, second and third bus members receiving one terminal of the cells of each of the respective positive half wave arms of said three-phase bridge connected rectifier; the other terminal of said cells of said positive half wave arms being connected to a respective positive bus bar extension positioned adjacent respective first cell receiving portions of said bus member; said second cell receiving portion of said first, second and third bus members receiving one terminal of the cells of each of the respective negative half wave arms of said three-phase bridge connected rectifier; the other terminal of said cells of said negative half wave arms being connected to a respective negative bus bar extension positioned adjacent respective second cell receiving portions of said bus members; all of said cells of said positive half wave arms being supported by said positive bus bar extensions and being PN type junctions, all of said cells of said negative half wave arms being supported by said negative bus bar extensions and being NP type junctions; said first portions of said bus members carrying magnetic laminations for magnetically coupling the individual currents carried by each of the said parallel connected cells of any of the positive arms of said three-phase bridge connected rectifier; said first portions of said bus members being comprised of parallel conductors having flat portions adjacent to said magnetic laminations.

6. In a high current capacity three-phase bridge connected rectifier system for transferring power between a D.-C. system and a three-phase A.-C. system; each of the arms of said three-phase bridge connected rectifier system having a plurality of parallel connected cells; a first, second, and third bus member connected to a respective phase of said three-phase A.-C. system; each of said first, second and third bus members being elongated members and having first and second cell receiving portions; said first and second cell receiving portions being axially spaced along their respective elongated members; said first cell receiving portion of said first, second and third bus members receiving one terminal of the cells of each of the respective positive half wave arms of said three-phase bridge connected rectifier; the other terminal of said cells of said positive half wave arms being connected to a respective positive bus bar extension positioned adjacent respective first cell receiving portions of said bus member; said second cell receiving portion of said first, second and third bus members receiving one terminal of the cells of each of the respective negative half wave arms of said three-phase bridge connected rectifier; the other terminal of said cells of said negative half wave arms being connected to a respective negative bus bar extension positioned adjacent respective second cell receiving portions of said bus members; all of said cells of said positive half wave arms being supported by said positive bus bar extensions and being PN type junctions, all of said cells of said negative half wave arms being supported by said negative bus bar extensions and being NP type junctions; said first portions of said bus members carrying magnetic laminations for magnetically coupling the individual currents carried by each of the said parallel connected cells of any of the arms of said positive three-phase bridge connected rectifier; said first portions of said bus members being comprised of parallel conductors having flat portions adjacent to said magnetic laminations; said first, second and third bus members being straight.

7. In a high current capacity three-phase bridge connected rectifier system for transferring power between a D.-C. system and a three-phase A.-C. system; each of the arms of said three-phase bridge connected rectifier system having a plurality of parallel connected cells; a first, second, and third bus member connected to a respective phase of said three-phase A.-C. system; each of said first, second and third bus members being elongated members and having first and second cell receiving portions; said first and second cell receiving portions being axially spaced along their respective elongated members; said first cell receiving portion of said first, second and third bus members receiving one terminal of the cells of each of the respective positive half wave arms of said three-phase bridge connected rectifier; the other terminal of said cells of said positive half wave arms being connected to a respective positive bus bar extension positioned adjacent respective first cell receiving portions of said bus member; said second cell receiving portion of said first, second and third bus members receiving one terminal of the cells of each of the respective negative half wave arms of said three-phase bridge connected rectifier; the other terminal of said cells of said negative half wave arms being connected to a respective negative bus bar extension positioned adjacent respective second cell receiving portions of said bus members; all of said cells being PN type junctions; all of said cells of said positive half wave arms being supported by said positive bus bar extension; all of said cells of said negative half wave arms being supported by said respective second portions of said bus members; said first, second and third bus bar members being bifurcated; the legs of said bifurcated bus bar members comprising said second portion of said bus bar members.

8. In a high current capacity three-phase bridge connected rectifier system for transferring power between a D.-C. system and a three-phase A.-C. system; each of the arms of said three-phase bridge connected rectifier system having a plurality of parallel connected cells; a first, second, and third bus member connected to a respective phase of said three-phase A.-C. system; each of said first, second and third bus members being elongated members and having first and second cell receiving portions; said first and second cell receiving portions being axially spaced along their respective elongated members; said first cell receiving portion of said first, second and third bus members receiving one terminal of the cells of each of the respective positive half wave arms of said three-phase bridge connected rectifier; the other terminal of said cells of said positive half wave arms being connected to a respective positive bus bar extension positioned adjacent respective first cell receiving portions of said bus member; said second cell receiving portion of said first, second and third bus members receiving one terminal of the cells of each of the respective negative half wave arms of said three-phase bridge connected rectifier; the other terminal of said cells of said negative half wave arms being connected to respective negative bus bar extension positioned adjacent respective second cell receiving portions of said bus members; all of said cells of said positive half wave arms being supported by said positive bus bar extensions and being PN type junctions, all of said cells of said negative half wave arms being supported by said negative bus bar extensions and being NP type junctions; said first portions of said bus members carrying magnetic laminations for magnetically coupling the individual currents carried by each of the said parallel connected cells of any of the positive arms of said three-phase bridge connected rectifier; said first portions of said bus members being comprised of parallel conductors having flat portions adjacent to said magnetic laminations; said negative bus bar extension carrying magnetic laminations for magnetically coupling the individual currents of each of the said parallel connected cells of any of the negative arms of said three-phase bridge connected rectifier.

9. In a high current capacity three-phase bridge connected rectifier system for transferring power between a D.-C. system and a three-phase A.-C. system; each of the arms of said three-phase bridge connected rectifier system having a plurality of parallel connected cells; a first, second, and third bus member connected to a respective phase of said three-phase A.-C. system; each of said first, second and third bus members being elongated members and having first and second cell receiving portions; said first and second cell receiving portions being axially spaced along their respective elongated members; said first cell receiving portion of said first, second and third bus members receiving one terminal of the cells of each of the respective positive half wave arms of said three-phase bridge connected rectifier; the other terminal of said cells of said positive half wave arms being connected to a respective positive bus bar extension positioned adjacent respective first cell receiving portions of said bus member; said second cell receiving portion of said first, second and third bus members receiving one terminal of the cells of each of the respective negative half wave arms of said three-phase bridge connected rectifier; the other terminal of said cells of said negative half wave arms being connected to a respective negative bus bar extension positioned adjacent respective second cell receiving portions of said bus members; all of said cells being NP type functions; all of said cells of said positive half wave arms being supported by said second portions of said bus members; all of said cells of said negative half wave arms being supported by said respective negative bus bar extensions; said first, second and third bus bar members being bifurcated; the legs of said bifurcated bus bar members comprising said second portion of said bus bar members.

References Cited in the file of this patent

UNITED STATES PATENTS

| 2,215,667 | Sherman | Sept. 24, 1940 |
| 2,224,755 | Werner | Dec. 10, 1940 |
| 2,889,498 | Boyer et al. | June 2, 1959 |

FOREIGN PATENTS

| 715,979 | Germany | Jan. 10, 1942 |
| 1,230,865 | France | Apr. 4, 1960 |